United States Patent
Visca et al.

(10) Patent No.: US 6,221,434 B1
(45) Date of Patent: Apr. 24, 2001

(54) SURFACE TREATMENTS WITH BIFUNCTIONAL PERFLUOROPOLYETHER DERIVATIVES

(75) Inventors: Mario Visca, Alessandria; Silvana Modena; Simonetta Fontana, both of Milan; Giovanni Gavazzi, Cassano D'Adda, all of (IT)

(73) Assignee: Ausimont S.p.A., Bollate (IT)

( * ) Notice: Subject to any disclaimer, the term of this patent is extended or adjusted under 35 U.S.C. 154(b) by 0 days.

(21) Appl. No.: 09/450,020

(22) Filed: Nov. 29, 1999

(30) Foreign Application Priority Data

Dec. 1, 1998 (IT) .............................. MI98A2605

(51) Int. Cl.$^7$ ........................................ B05D 3/02
(52) U.S. Cl. .................. 427/393.4; 427/389.8; 427/389.9; 427/391; 427/392; 427/393.5; 427/394; 427/395; 427/396; 427/397; 427/393
(58) Field of Search ............... 427/389.8, 389.9, 427/391, 392, 393, 393.4, 393.5, 394, 395, 396, 397, 399, 400

(56) References Cited

U.S. PATENT DOCUMENTS

| | | | |
|---|---|---|---|
| 2,803,615 | * 8/1957 | Ahlbrecht et al. | 524/805 |
| 2,839,513 | * 6/1958 | Ahlbrecht et al. | 526/264 |
| 2,995,542 | * 8/1961 | Brown | 526/243 |
| 3,356,628 | * 12/1967 | Smith et al. | 524/544 |
| 3,814,741 | * 6/1974 | Caporiccio et al. | 526/246 |
| 3,992,374 | * 11/1976 | Rufer et al. | 544/139 |
| 4,085,137 | * 4/1978 | Mitsch et al. | 564/160 |
| 4,499,146 | * 2/1985 | Piacenti et al. | 428/422 |
| 4,745,009 | * 5/1988 | Piacenti et al. | 427/393.5 |
| 4,983,666 | * 1/1991 | Zavaretti et al. | 524/539 |
| 5,068,135 | * 11/1991 | Zavaretti et al. | 427/439 |
| 5,271,806 | * 12/1993 | Deutsch et al. | 427/395 |

FOREIGN PATENT DOCUMENTS

| | | |
|---|---|---|
| 603 697 | * 6/1994 | (EP) . |
| 687 533 | * 12/1995 | (EP) . |
| 0 844 265 | 5/1998 | (EP) . |

* cited by examiner

Primary Examiner—Peter Szekely
(74) Attorney, Agent, or Firm—Guido Modiano; Albert Josif; Daniel O'Byrne

(57) ABSTRACT

A surface treatment method for imparting -oil- and/or water-repellency, comprising the step of applying to the surface to be treated compositions comprising at least one compound having the formula III $$ACF_2O-(CF_2O)_n(C_2F_4O)_m-CF_2-B \qquad III$$

where n=1–20, m=1–20 and A and B are reactive functional groups chosen independently from the group constituted by:
a) CONHR, where R=$C_nH_{2n+1}$ with n=1–30,
b) $CH_2OH$,
c) $CONH(X)SiR^1{}_n(OR')_{3-n}$, where n=0–2, $R^1$ and R', identical or different, are $C_rH_{2r+1}$ alkyl radicals, where r=1–4, and X is a bifunctional alkyl spacer of the $(CHR'')_m$ type, where m=1–20, and R'' can be H or $CH_3$, optionally containing heteroatoms,
d) $-[CH_2O(R'''O)_p]_k-P(O)(OH)_{3-k}$, where R''' is an alkylene radical, for example $C_2H_4$ or $C_3H_6$, p=1–10 and k=1, 2, the composition comprising the compound at a suitable concentration and being applied in an amount suitable to obtain substantially at least one monolayer of the compound on the surface to be treated, the reactive groups being chosen according to the nature of the surface to be treated so as to provide interaction with the surface to be treated.

15 Claims, No Drawings

SURFACE TREATMENTS WITH BIFUNCTIONAL PERFLUOROPOLYETHER DERIVATIVES

This application claims priority from Italian Patent Application No. MI98A002605 filed Dec. 1, 1998;

BACKGROUND OF THE INVENTION

The present invention relates to the surface treatment with functional derivatives of perfluoropolyethers, particularly in order to provide oil- and/or water-repellency.

It is known in the art to use, for the surface treatment, fluorinated acrylic compounds and polymers containing perfluoroalkanes or perfluoropolyethers in graft position (U.S. Pat. Nos. 2,803,615; 2,839,513; 2,995,542; 3,356,628 in the name of 3M; U.S. Pat. No. 3,814,741 in the name of this same Applicant), surfactants and monofunctional derivatives with a perfluoroalkyl chain, for example perfluoroalkylphosphates for the oil-repellency treatment of paper (U.S. Pat. No. 5,271,806), silicones and fluorosilicones, and polyurethanes fluorinated by bifunctional perfluoropolyethers (U.S. Pat. Nos. 4,983,666; 5,068,135 in the name of this same Applicant).

In particular, U.S. Pat. No. 4,499,146 discloses the use of perfluoropolyethers with perfluoroalkyl endgroups to protect building materials such as marble, stone, bricks, cement and the like against the action of atmospheric agents and pollutants. These products provide oil- and/or water-repellency, are characterized by high permeability to gases and vapors and do not alter the appearance and color of the materials to which they are applied. However, on porous materials the protective action of these compounds decreases over time as a consequence of the migration of the perfluoropolyethers from the surface toward the inside of the material.

Better results have been reported for the use of perfluoropolyethers functionalized with groups capable of anchoring the product to the substrate to be protected. The use of said derivatives, functionalized with carboxyl, ester, amide, hydroxyl, diisocyanate, epoxy, silane groups etcetera to protect building materials against the action of atmospheric agents and pollutants is disclosed in U.S. Pat. No. 4,745,009. Various other functional derivatives of perfluoropolyethers are disclosed in U.S. Pat. No. 4,085,137.

Moreover, U.S. Pat. No. 3,492,374 discloses the use of phosphoric esters with a perfluoropolyether chain having the formula I

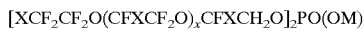

$$[XCF_2CF_2O(CFXCF_2O)_xCFXCH_2O]_2PO(OM) \qquad \text{I}$$

where X is —F or —$CF_3$; x is an integer from 1 to 8; M is a cation, such as $H^+$, an alkaline metal ion, or an ammonium ion, optionally alkyl-substituted;

in order to impart oil-repellency to materials such as fabrics, fibers, hide, paper, plastic claddings, wood, ceramics.

Besides, EP-A-603697 discloses the use of a compound having the formula II

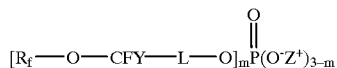

$$[R_f\text{—}O\text{—}CFY\text{—}L\text{—}O]_m\overset{O}{\underset{\|}{P}}(O^-Z^+)_{3-m} \qquad \text{(II)}$$

where L is a divalent organic group; m=1; Y is —F or —$CF_3$; $Z^+$ is chosen among $H^+$, $M^+$ where M is an alkaline metal, $N(R)_4^+$ where the R groups are mutually identical or different and are H or $C_1$–$C_6$ alkyls; $R_f$ is a chain of polyperfluoroalkylene oxide, for imparting oil- and water-repellency to surfaces made of ceramics, particularly Tuscany terracotta tiles, so-called "cotto toscano".

The use of the same compounds to impart oil- and water-repellency to cellulose materials, metallic materials, glass-like materials, cement, marble and the like is disclosed in EP-A-687533.

SUMMARY OF THE INVENTION

The aim of the present invention is to provide a method for treating surfaces which is specific for certain types of surfaces, particularly paper, terracotta tiles so-called "cotto", wood and fabrics and is adapted to obtain treated surfaces which have a better performance and longer permanence and durability of the treatment.

Within the scope of this aim, an object of the present invention is to provide surface treatments for imparting oil- and/or water-repellency to the surfaces to be treated and for imparting at the same time a better handle (for example for fabrics) than known treatments, such as those with acrylic compounds.

Another object of the present invention is to provide surface treatments which allow to obtain better oil- and water-repellency properties for the same applied product quantity with respect to treatments using monofunctional compounds (for example for wood).

This aim, these objects and others which will become apparent hereinafter are achieved by the surface treatment method for imparting oil- and/or water-repellency according to the present invention, which comprises the step of applying to the surface to be treated at least one compound having the formula III

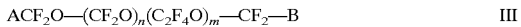

$$ACF_2O\text{—}(CF_2O)_n(C_2F_4O)_m\text{—}CF_2\text{—}B \qquad \text{III}$$

where n=1–20, m=1–20 and A and B are reactive functional groups chosen independently from the group consisting of:
a) CONHR, where R=$C_nH_{2n+1}$ with n=1–30, for example R=$C_{18}H_{37}$,
b) $CH_2OH$,
c) $CONH(X)_{m'}SiR^1_{n''}(OR')_{3-n''}$ where n''=0–2, $R^1$ and R' identical or different, are $C_rH_{2r+1}$ alkyl radicals, where r=1–4 and X X=CHR'', there m'm=1–20, and R'' can be H or $CH_3$, optionally containing heteroatoms, for example $CONH(CH_2)_3Si(OR')_3$, where R'=$CH_3$, $C_2H_5$,
d) —$[CH_2O(R'''O)_p]_k$—$P(O)(OH)_{3-k}$, where R''' is an alkylene radical, for example $C_2H_4$ or $C_3H_6$, p=1–10 and k=1, 2, said method being characterized in that said composition (1) comprises said compound at a suitable concentration and (2) is applied in an amount suitable to obtain substantially at least one monolayer of said compound on the surface to be treated, said reactive groups being chosen according to the nature of the surface to be treated so as to provide a strong interaction with the surface to be treated.

DETAILED DESCRIPTION

The Applicant has found that the reactive endgroups of the above-mentioned group are capable of specifically interacting with various types of surfaces, ensuring thereby the bonding of the compound to the surface to be treated in a stable manner, during the step for treatment and post-treatment of the substrate.

In order to carry out the present invention it is possible to use a compound having the formula III in which the groups A and B are mutually identical or different or it is possible to use in combination different compounds having the formula III with different and mutually compatible endgroups.

Advantageously, the method according to the present invention when used for treating wood surfaces uses a composition which contains the compound having the formula III, in which the reactive functional endgroups A and B are amide groups having the formula CONHR, where R is an alkyl group, for example $C_{18}H_{37}$. Preferably, the compound is included in a hydrocarbon-based solution, but it can be used in different forms, including water-based emulsion. Interaction between the endgroups and the surface of the wood is not particularly strong, since it is based only on hydrophobic interaction. The presence of two endgroups considerably reinforces the interaction, since removal of the treatment agent is dependent on the simultaneous breakaway of the two groups from the surface, which is statistically far less likely than the breakaway of a single bond.

The concentration of the compound in the composition applied to the wood surface is suitable to provide at least one monolayer of compound on the surface to be treated, and is conveniently comprised between 0.01 and 40% and preferably between 1 and 20% by weight.

Conveniently, when the method according to the present invention is used for the treatment of surfaces or fabrics, for example cotton, the composition that is applied comprises a compound having the formula III in which the reactive endgroups are silane groups, for example having the formula $CONH(CH_2)_3Si(OR)_3$, where R' is an alkyl group, preferably methyl or ethyl.

The interaction between the functional endgroup and the surface is the typical interaction of silanes, forming strong bonds with the hydroxylated surface. The presence of the two functions on the molecule ensures a better configuration at the interface, induced by the formation of two bonds with the surface.

The concentration of the compound in the composition to be applied to the surface is suitable to obtain at least one monolayer of compound on the surface and is conveniently comprised between 0.01 and 40% by weight.

Advantageously, when the method according to the present invention is used for treating paper or ceramics, in particular terracotta tiles, so-called "cotto", and stoneware tiles, so-called "gress", the composition applied to the surface to be treated contains the compound having the formula III, where the reactive endgroups are phosphoric ester groups, for example having the formula $-[CH_2O(R'''O)_p]_k-P(O)(OH)_{3-k}$, where R''' is an alkylene group, particularly an ethylene group, p=1–10 and k=1, 2.

The concentration of compound III in the composition is suitable to obtain at least one monolayer of compound III on the surface to be treated and is advantageously comprised between 0.01 and 40% by weight.

Compounds having the formula III used to carry out the present invention can be obtained by means of methods known in the art.

The present invention will become apparent from the following examples, which are given merely by way of non-limitative illustration of the invention.

EXAMPLES

The degrees of oil- and water-repellency were determined by examining the behavior of a drop of liquid deposited on the treated surface.

The parameters considered in order to evaluate the degree of oil- and water-repellency were chosen according to the surface being treated. For example, the oil-repellency of the treated paper was evaluated by using the TAPPI UM 557 test, based on the deposition-absorption on the treated surface of drops of mixtures having different contents of castor oil, toluene and n-eptane.

The parameter used to evaluate the water-repellency of treated "cotto" surfaces was the absorption time of a drop of water applied to the treated surface.

The parameter used to evaluate the degree of oil- and water-repellency of wood was the area of the stain formed by a drop applied to the treated surface at various times after application.

The tests according to TAPPI UM 557 were conducted by arranging each sample on a clean flat surface, with the test surface upward, without touching the surface to be tested. A drop of test solution was applied to the area to be tested from a height of approximately 2.5 cm. Exactly 15 seconds after application of the drop, the excess fluid was removed with a clean cloth of cotton or fabric and the wetted area was examined immediately in order to determine whether an area of dark color caused by penetration of the liquid had remained, even on a small surface, beneath the drop. The procedure was repeated by applying each time the drop of liquid to a portion of the treated surface that had not yet been touched by other drops.

The resulting degree of oil-repellency is indicated by the number that corresponds to the solvent that remains on the surface of the sample for 15 seconds without producing a stain due to liquid penetration. The reported results are the average of tests conducted with five samples, approximated to the nearest integer.

Example 1

A 1% by weight solution of bifunctional phosphoric ester derivative having the formula IV:

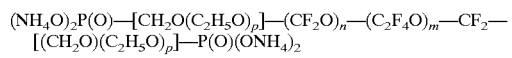

in a 4% aqueous solution by weight of isopropyl alcohol was prepared. The used derivative had an average molecular weight of 1000 and was characterized by average values of p=1.5, n=2.5 and m=5.

Pieces of sized paper measuring 5 cm by 5 cm were immersed in the solution and then dried in a stove at 50° C. for 45 minutes.

The oil-repellency of the treated pieces of paper was evaluated using the TAPPI UM 557 test.

The degree of oil-repellency evaluated as an average of the results obtained for 5 tests was 6.

Example 2

The test of example 1 was repeated by using, instead of the 1% by weight solution, a solution at a concentration of 2% by weight of bifunctional phosphoric ester derivative having the formula IV.

The degree of oil-repellency of the treated pieces of sized paper, determined with the TAPPI UM 557 test, was 8.

Comparative Example 1

The test of example 1 was repeated by using a solution of an ammonium salt of perfluoroalkyl phosphoric diester at 1% concentration in an aqueous solution at 4% by weight of isopropyl alcohol instead of the solution of the compound having the formula IV.

The degree of oil-repellency of the pieces of treated paper was found to be 5.

Comparative Example 2

The tests of example 1 were repeated by using a solution of a phosphoric monoester with a perfluoropolyether chain having the formula $$Cl(C_3F_6O)_nCF_2-[CH_2O(C_2H_5O)_p]-P(O)(ONH_4)_2 \quad V$$

where n=3 and p=1.5.

at 1% by weight in aqueous isopropyl alcohol at 4% by weight instead of the solution of the compound having the formula IV.

The degree of oil-repellency found was 5.

Comparative Example 3

The tests of example 1 were repeated by using a solution of a phosphoric diester of a monofunctional derivative having a perfluoropolyether structure having the formula $$Cl(C_3F_6O)_nCF_2-[CH_2O(R''O)_p]-P(O)(OH) \quad VI$$

where n=3 and p=1.5, at 1% by weight in aqueous isopropyl alcohol at 4% by weight instead of the solution of the compound having the formula IV.

The degree of oil-repellency found was 5.

Comparative Example 4

The tests of comparison example 3 were repeated by using a solution at a concentration of 2% by weight instead of the solution at a concentration of 1% by weight of phosphoric diester of a monofunctional derivative having a perfluoropolyether structure having the formula VI.

The degree of oil-repellency found was unchanged.

Example 3

Two solutions were prepared at 2% by weight each of a bifunctional phosphoric ester having the formula:

$$(HO)_2P(O)-[CH_2O(C_2H_5O)p]-(CF_2O)_n-(C_2F_4O)_m-CF_2-[(CH_2O)(C_2H_5O)_p]-P(O)(OH)_2 \quad VII$$

respectively having an average molecular weight of 1000 (average values of n and m of 2.5 and 5 respectively, average value of p=1.5) and an average molecular weight of 2000 (average values of n and m of 8 and 8 respectively, and average value of p=1.5) in a mixture of water/isopropanol at 40:9 by weight.

This solution was brushed onto surfaces of medium-porosity "cotto toscano" in such an amount as to obtain a final concentration of 2 g/m².

Drops of distilled water were deposited on the treated surfaces.

The drop absorption time was found to be 40 minutes for surfaces treated with the derivative having an average molecular weight of 1000 and 50 minutes for the derivative having an average molecular weight of 2000.

Example 4

The tests of example 3 were repeated by using 2% solutions of bifunctional derivative of salified phosphoric ester with an average molecular weight of 2000 (average values n=m=8, p=1.5) in water/isopropanol at 40:9 weight:weight.

The absorption time of the double-distilled water drops on the treated "cotto" surfaces was 60 minutes.

Comparative Example 5

The tests of example 3 were repeated by using 2% by weight solutions of the compound of comparison example 1.

The absorption time of the double-distilled water drops on the treated "cotto" surfaces was 30 minutes.

Example 5

A 10% by weight solution of bifunctional amide derivative having the formula $$H_{37}C_8HNOC-CF_2O(CF_2O)_4-(C_2F_4O)_4-CF_2-CONH \\ C_{18}H_{37} \quad VIII$$

with an average molecular weight of 2000 (average values n=m=8, p=1.5) in a composition of paraffin waxes in a hydrocarbon solvent was prepared.

Surfaces of Hemlok wood were brush-treated with this solution.

10-µl petrolatum drops were deposited on the treated wood surfaces.

The area of the petrolatum drop on the treated wood surface was measured 5, 10, 15 and 20 minutes after deposition.

The results are reported in Table 1.

Examples 6 and 7

The tests of example 5 were repeated by using 5% and 1% concentrations by weight, respectively, of the bifunctional amide compound having the formula VIII.

The results are reported in Table 1.

Comparative Example 6

The tests of example 5 were repeated by treating the surfaces of Hemlok wood with the same composition of paraffin waxes in a hydrocarbon solvent without adding bifunctional amide derivative.

The results are reported in Table 1.

Comparative Example 7

The tests of examples 5–7 were repeated using hydrocarbon solutions of a compound having the formula IX:

$$Cl(C_3F_6O)_nCF_2CONHC_{18}H_{37} \quad IX$$

where n=3, with concentrations of 10%, 5% and 1% respectively.

The results are reported in Table 1.

TABLE 1

Area of the drop of petrolatum (mm²) as a function of time

| Example | Concentration of the treatment agent (%) | Area after 5 min. | Area after 10 min. | Area after 15 min. | Area after 20 min. |
|---|---|---|---|---|---|
| 5 | 10 | 22 | 22 | 25 | 26 |
| 6 | 5 | 15 | 15 | 15 | 15 |
| 7 | 1 | 10 | 10 | 14 | 15 |
| 6, comparative | 0 | 61 | 82 | 98 | 100 |
| 7, comparative | 10 | 34 | 36 | 40 | 40 |
| 7, comparative | 5 | 33 | 41 | 50 | 52 |
| 7, comparative | 1 | 45 | 51 | 53 | 53 |

Examples 8–10

The tests of examples 5–7 were repeated, except for the fact that 5-µl drops of lubricating oil were applied instead of the petrolatum drops to the treated surfaces and that the areas of the drops were measured 24 hours after deposition.

The results are reported in Table 2.

Comparative Example 8

The tests described in comparison example 7 were repeated by using 5 μl of lubricating oil instead of petrolatum. The area of the oil drops was measured after 24 hours.

The results reported in Table 2.

TABLE 2

Area of the lubricating oil drop after 24 hours

| Example | Concentration of the treatment agent (%) | Area after 24 hours (mm²) |
|---|---|---|
| 8 | 10 | Completely absorbed |
| 9 | 5 | 25 |
| 10 | 1 | 20 |
| 8, comparative | 10 | Completely absorbed |
| 8, comparative | 5 | Completely absorbed |
| 8, comparative | 1 | Completely absorbed |

Example 11

In order to evaluate the degree of water-repellency of wood, drops of a water/isopropanol solution were deposited on treated wood surfaces and the dimensions of the stains remaining on the treated surfaces after the application of the drops were measured after certain times.

Drops of a 30/70 water/isopropyl alcohol solution having a volume of 5 μl were applied to wood surfaces treated with a solution of paraffin waxes in a hydrocarbon solvent containing 10% by weight of the compound of formula VIII with a molecular weight of 2000. The dimensions of the drops on the surface of the treated wood were measured 1 minute after deposition.

The results are reported in Table 3.

Examples 12–13

The tests of example 11 were repeated by using wood surfaces treated with solutions of hydrocarbon waxes in a hydrocarbon solvent containing 5% and 1% by weight, respectively, of the same compound having the formula VIII.

The results are reported in Table 3.

Comparative Example 9

The tests of examples 11–13 were reproduced by using wood surfaces treated with the same hydrocarbon wax based compositions with the addition of equivalent concentrations of a monofunctional compound having the formula IX, where n=3.

The results are reported in Table 3.

Comparative Example 10

The test described in example 11 was repeated by using wood treated with the same hydrocarbon wax based composition without additives.

The results are reported in Table 3.

TABLE 3

Area of a 5-μl drop of a 30/70 water/isopropanol solution after 1 minute

| Example | Concentration of the treatment agent (%) | Area after 1 min. (mm²) |
|---|---|---|
| 11 | 10 | 9 |
| 12 | 5 | 7 |
| 13 | 1 | 6 |
| 9, comparative | 10 | 11 |
| 9, comparative | 5 | 13 |
| 9, comparative | 1 | 18 |
| 10, comparative | 0 | 40 |

What is claimed is:

1. A surface treatment method for imparting oil- and/or water-repellency, comprising the step of applying to the surface to be treated compositions comprising at least one compound having the formula III $$ACF_2O-(CF_2O)_n(C_2F_4O)_m-CF_2-B \qquad III$$

where n=1–20, m=1–20 and A and B are reactive functional groups independently selected from the group consisting of:
a) CONHR, where $R=C_{n'}H_{2n'+1}$ with n'=1–30,
b) $CH_2OH$,
c) $CONH(X)_{m'}SiR^1_{n''}(OR^1)_{3-n''}$ where n''=0–2, $R^1$ and R', identical or different, are $C_rH_{2r+1}$ alkyl radicals, where r=1–4 and X is CHR'', where m'=1–20, and R'' can be, H or $CH_3$, optionally containing heteroatoms, and
d) $-(CH_2O(R'''O)_p)_k-P(O)(OH)_{3-k}$, where R''' is an alkylene radical, p=1–10 and k=1, 2,
said method being characterized in that said composition (1) comprises said compound at a suitable concentration and (2) is applied in an amount suitable to obtain substantially at least one monolayer of said compound on the surface to be treated, said reactive groups being chosen according to the nature of the surface to be treated so as to provide interaction with the surface to be treated.

2. The method according to claim 1, wherein the surface to be treated is a wood surface and said composition comprises a compound having the formula III, where A and B are amide groups of the formula CONHR, where R is an alkyl group.

3. The method according to claim 2, wherein the concentration of the compound having the formula III in said composition is from 0.01 to 40% by weight.

4. The method according to claim 1, wherein said surface to be treated is a fabric surface and said composition comprises a compound having the formula III, where A and B are silane groups having the formula $CONH(CH_2)_3Si(OR')_3$, where R' is an alkyl group.

5. The method according to claim 4, wherein the concentration of the compound having the formula III in the composition is from 0.01 to 40% by weight.

6. The method according to claim 1, wherein said surface is a paper surface and said composition comprises a compound having the formula III, where A and B are phosphoric ester groups having the formula $$-(CH_2O(R'''O)_p)_k-P(O)(OH)_{3-k},$$

where R''' is an alkylene group, p=1–10, k=1, 2.

7. The method according to claim 6, wherein the concentration of said compound is from 0.01 to 40% by weight.

8. The method according to claim 1, wherein said surface to be treated is a ceramic surface, and said composition comprises a compound having the formula III, where A and B are phosphoric ester groups having the formula

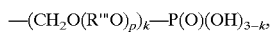

where R''' is an alkenyl group, p=1–10, k=1, 2.

9. The method according to claim 8, wherein the concentration of the compound is from 0.01 to 40% by weight.

10. The method according to claim 1, wherein R=$C_{18}H_{37}$.

11. The method according to claim 1 wherein R''' is ethylene or propylene.

12. The method according to claim 2 wherein R is $C_{18}H_{37}$.

13. The method according to claim 4 wherein R' is methyl or ethyl.

14. The method according to claim 6 wherein R''' is ethylene or propylene.

15. The method according to claim 8 wherein R''' is ethylene or propylene.

* * * * *